United States Patent [19]
Kleinschmidt

[11] Patent Number: 6,065,437
[45] Date of Patent: May 23, 2000

[54] FOUR-VALVE CYLINDER HEAD OF AN INTERNAL COMBUSTION ENGINE

[75] Inventor: Anton Kleinschmidt, Brühl, Germany

[73] Assignee: Deutz AG, Cologne, Germany

[21] Appl. No.: 09/092,384

[22] Filed: Jun. 5, 1998

[51] Int. Cl.[7] ....................................................... F02F 1/38
[52] U.S. Cl. .......................................... 123/193.5; 123/302
[58] Field of Search ................................. 123/193.5, 294, 123/302, 432

[56] References Cited

U.S. PATENT DOCUMENTS

| | | | |
|---|---|---|---|
| 3,824,971 | 7/1974 | Skatsche et al. | 123/193.5 |
| 3,831,573 | 8/1974 | Excoffon | 123/193.5 |
| 5,299,540 | 4/1994 | Fransson et al. | 123/193.5 |
| 5,365,900 | 11/1994 | Farnlund et al. | 123/193.5 |
| 5,743,218 | 4/1998 | Aupperle et al. | 123/193.4 |

FOREIGN PATENT DOCUMENTS 22 34 642  2/1973  Germany .

*Primary Examiner*—Marguerite McMahon
*Attorney, Agent, or Firm*—Nexsen Pruet Jacobs & Pollard, LLP; Charles L. Schwab

[57] ABSTRACT

An internal combustion engine is furnished with a cross flow cylinder head 1 having an exhaust duct 11 which opens on a longitudinal side wall 12 and two intake ducts 10a, 10b which open on the upper cover surface 14 in a region of the cylinder head 1 on the side toward the longitudinal side wall 12. By having the intake ducts and the exhaust duct on the same longitudinal side of the internal combustion engine relative to the central vertical longitudinal plane through the internal combustion engine, the opposite longitudinal side of the internal combustion engine remains completely free for other attachments. A pair of intake valve stem openings 8a, 8b and a pair of exhaust stem valve stem openings 9a, 9b lie in parallel planes disposed at an angle to a longitudinal plane through the axis of the engine cylinder and an injection line opening 20 extends from the aforesaid opposite longitudinal side and between said planes to an injection valve mounting hole 17.

10 Claims, 1 Drawing Sheet

FOUR-VALVE CYLINDER HEAD OF AN INTERNAL COMBUSTION ENGINE

TECHNICAL FIELD

This invention relates to an internal combustion engine having a crankcase in which there is rotatably supported a crankshaft for which at least one connecting rod bearing a piston is articulated, the piston being movable in a cylinder covered by a cylinder head so as to form a combustion chamber. The cylinder head structure for each cylinder includes two intake valves connected to two intake ducts and two exhaust valves provided with at least one exhaust duct as well as an injection valve opening extending to the combustion chamber.

BACKGROUND OF THE INVENTION

German patent document DE-OS 22 34 642, published Feb. 15, 1973, shows an internal combustion engine with two intake valves and two exhaust valves for each cylinder with intake and exhaust ducts extending to opposite longitudinal side walls of the internal combustion engine. The pair of intake valves on the one hand and the pair of exhaust valves on the other hand are arranged symmetrically with respect to one other about a plane which is approximately 45° to the longitudinal plane through the axis of the cylinders and crankshaft of the internal combustion engine. Although the internal combustion engine with such a crossflow cylinder head has favorable intake and exhaust flow, there are disadvantages, particularly with respect to the mounting of necessary components such as, for example, the injection lines. In this prior engine design, the injection line can only be connected coaxially to the injection valve, or the injection valve mount, and, as a consequence, must necessarily be routed over the cylinder head or over the cylinder head cover and externally along the intake duct or the exhaust duct. Furthermore, when mounting an exhaust-gas turbocharger, the compressed charge air must be routed over the cylinder-head cover of the internal combustion engine to the opposite longitudinal side of the internal combustion engine. Alternatively, it is possible to provide a connecting line on the end face; this solution, however, requires additional structural space in the longitudinal direction of the internal combustion engine.

OBJECTS AND SUMMARY OF THE INVENTION

It is an object of the invention to create an internal combustion engine in which the above cited disadvantages are avoided and is a favorable design from a manufacturing engineering standpoint.

This and other objects are achieved by providing exhaust ducts that open on one longitudinal side wall and intake ducts that open on the upper cover surface in a region of the cylinder head on the side toward the beforementioned longitudinal side wall. This design has the advantage that favorable flow conditions are achieved similar to a crossflow cylinder head; and additionally, the suction line and exhaust line are arranged on the same longitudinal side of the internal combustion engine. The opposite longitudinal side of the internal combustion engine remains completely free for other attachments, and the suction line and the exhaust line can be connected directly to a turbocharger. Further advantageous design options also arise with the use of a supplemental charge-air heat exchanger, and here also there is no need to route any exhaust or intake line over the cylinder head.

The exhaust ducts are combined, at least in the opening region on the longitudinal side wall. In the opening region no special requirements are imposed on the gas conveyance in the exhaust ducts. All that is important here is that the hot exhaust gas be led in the shortest and most direct way possible from the combustion chamber into the exhaust line, it being necessary that the heating of the surrounding components be as slight as possible.

The intake ducts of a cylinder open separately from one another on the upper cover surface. One of the intake ducts is designed as a swirl duct and the other intake duct is designed as a fill duct. By virtue of the fact that the ducts open separately on the upper cover surface, a control valve can be inserted in at least one of the two intake ducts of each cylinder in a problem-free manner, said control valve closing completely or at least partially in dependence on the operating conditions (in particular under partial load).

In further development of the invention, the intake ducts of a cylinder are separated by a cylinder head stud hole. Here the swirl duct is wound around the cylinder head stud hole in such a way that the swirling shape of the duct arises by means of this circumstance that comes about in a compulsory way essentially for design reasons. A further advantage of this invention is provided by virtue of the intake duct designed as a fill duct of a first cylinder opening on the upper cover surface above the exhaust duct of the neighboring cylinder. Thus this intake duct is externally—in the direction to the next cylinder unit—led around the just mentioned cylinder head stud hole and opens on the upper cover surface above the neighboring exhaust duct. In this region there is sufficient space available so that no restrictions exist with respect to the sizing of the fill duct.

The advantages hereinbefore described can be attained in a particularly advantageous manner if the valve stem guides of the intake valves and of the exhaust valves are arranged in parallel planes that are preferably arranged rotated by 30° relative to a transverse plane through the cylinder axis. By this design, very short exhaust ducts can be used, the exhaust duct of one exhaust valve being led by virtually the shortest path to a longitudinal side wall of the cylinder head and the exhaust duct to the second exhaust valve essentially consisting in a straight line prolongation of the first duct. The hot exhaust gas thus flows into the exhaust manifold with the slightest possible changes of direction, which is particularly critical with respect to heat transfer. In further development of the invention, at least one coolant space is provided in the regions between the intake ducts and exhaust ducts.

In development of the invention, the injection valve is connectable to an injection line arranged at least approximately at a right angle to the longitudinal axis of the injection valve, which injection line is led through a duct or opening in the cylinder head, which duct opens on the longitudinal side wall opposite to the cylinder head side wall having the openings of the exhaust ducts. This design permits an extremely short injection line, particularly when used in an engine having a high-pressure pump element for each cylinder which is inserted into the crankcase near the joint between the crankcase and the cylinder head. The fuel line opening is made in the cylinder head at the same angle to a transverse plane through the cylinder axis as the planes through intake and exhaust valve stem guides. By this means, the fuel line opening can be routed between the valve stem guides of the intake valves and valve stem guides of the exhaust valves, as well as between the cylinder head studs.

BRIEF DESCRIPTION OF THE DRAWINGS

Further advantageous developments of the invention can be inferred from the description of the drawings, in which.

DETAILED DESCRIPTION OF THE DRAWINGS

Figure 1:
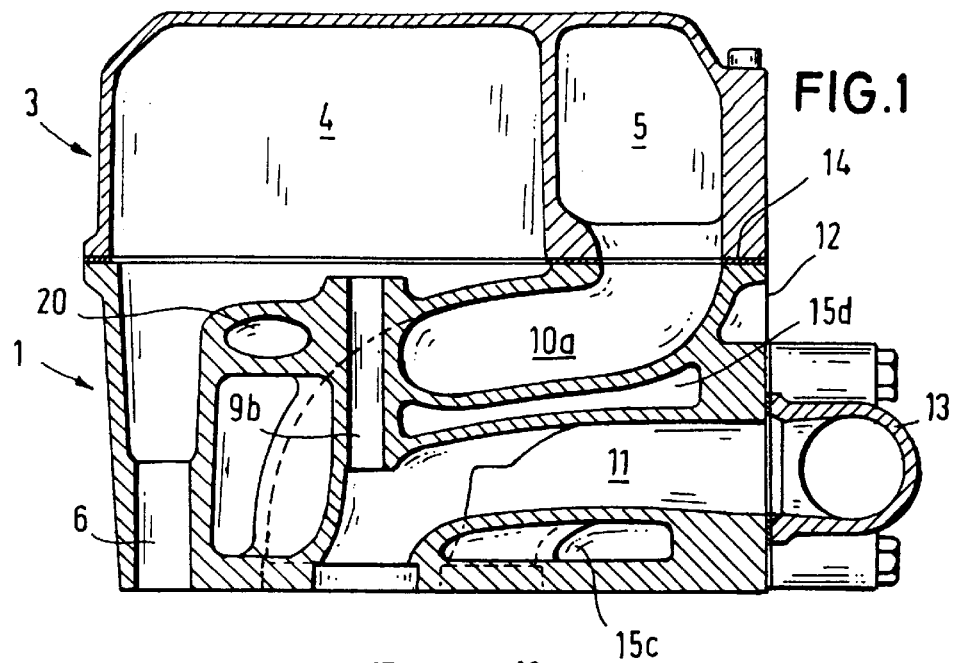
FIG. 1 is a vertical section, taken on line I—I in FIG. 2, through a cylinder head with a cylinder head cover attached and, FIG. 2 is a top view of the cylinder head with the cylinder head cover removed and parts broken away to show details of construction.
Figure 2:
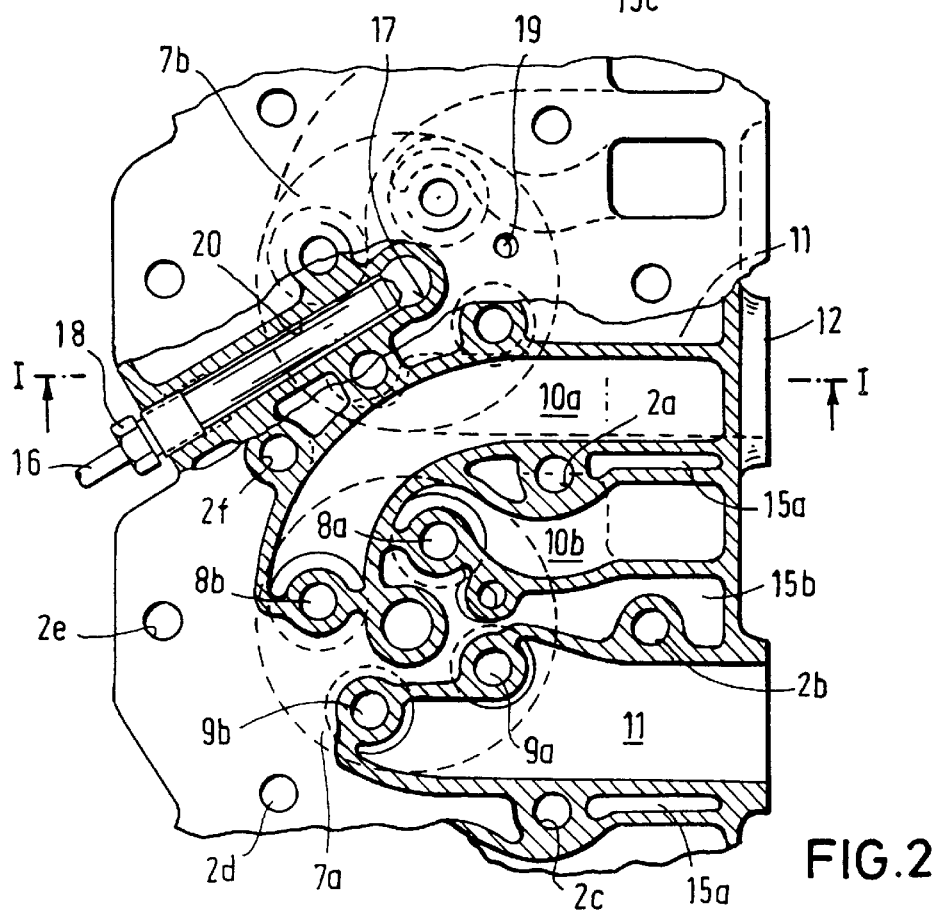

The cylinder head 1 in FIG. 1 is designed as a block cylinder head for a self-ignition, multicylinder, in-line internal combustion engine. The cylinder head 1 is mounted on a crankcase by means of cylinder head studs, which are led through cylinder head stud holes 2a to 2f. The cylinder head stud holes 2a, 2c, 2d and 2f are arranged between two neighboring cylinders 7a, 7b (except at the end of the cylinder head), while the cylinder head stud holes 2b and 2e are arranged in the region of the central transverse planes through the axes of cylinders 7a, 7b. The cylinder head 1 is enclosed above by a cylinder head cover 3, the cylinder head cover 3 being subdivided into an oil compartment 4 and a combustion air compartment 5. The partition between the oil compartment 4 and the combustion air compartment 5 can be specially insulated for acoustical and thermal reasons or, if applicable, can be made double-walled. Arranged in the oil compartment 4, in particular, are the rocker arms for actuating the intake valves and exhaust valves, the rocker arms being actuated via push rods by the camshaft of the internal combustion engine, and the push rods being guided through the cylinder head in push rod compartments 6.

Intake valve stem holes 8a, 8b as well as exhaust-valve stem holes 9a, 9b are made in the cylinder head 1 above the associated cylinders 7a, 7b. Valve stem guides are preferably inserted in these intake valve stem holes 8a, 8b and exhaust valve stem holes 9a, 9b, in which guides the valve stems of the intake valves and exhaust valves are movable. The cylinder ends of the intake valve stem holes 8a, 8b and the exhaust valve stem holes 9a, 9b open into intake ducts 10a, 10b and one exhaust duct 11, respectively. The exhaust ducts 11 of each cylinder are led by a short path to a longitudinal side wall 12 of the cylinder head 1, the individual exhaust ducts 11 of the cylinder head being connected to one another via an exhaust header or manifold 13 secured laterally onto the longitudinal side wall 12 by cap screws. The intake ducts 10a, 10b of each of the cylinders 7a, 7b are led to the upper cover surface 14 of the cylinder head 1 in a region toward the longitudinal side wall 12. The intake duct 10a is further designed as a fill duct and the intake duct 10b is designed as a swirl duct. The intake duct 10b (swirl duct) is designed to pass around the cylinder head stud hole 2a in such a way that the intake air is caused to swirl as it enters the cylinder. The intake duct 10a (fill duct) corresponds approximately to a 90° arc and is led around the other side of the cylinder head stud hole 2a and opens, as explained, on the upper cover surface 14 in the region of the cylinder 7b lying adjacent to the cylinder 7a, and above its exhaust duct 11. The two intake ducts 10a, 10b each open into the combustion air compartment 5 of the cylinder head cover 3.

By providing coolant spaces 15a to 15d, which are all connected to one another, the exhaust duct 11 is largely thermally insulated from the other walls of the cylinder head 1 and, in particular, also from the intake duct 10a.

The intake valve holes 8a, 8b and the exhaust valve holes 9a, 9b are disposed in two parallel planes that are preferably rotated by 30° relative to a transverse plane through the axis of the associated cylinder. A horizontally extending injection line duct 20 for an injection line 16 is arranged parallel to and between these two planes of the intake valve holes and exhaust valve holes. The injection line 16 abuttingly connects with an injection valve inserted into a central injection valve mounting hole 17. In the region of the injection line duct 20, the injection line 16 has a compression piece pressed against the injection valve by a fastening screw 18 screwed into the cylinder head.

In approximate coplanar relation to the duct 20, a glowplug opening 19 is provided for the insertion of one glow plug per cylinder.

What is claimed is:

1. In an internal combustion engine having a crankcase with a cylinder and a crankshaft to which a connecting rod bearing a piston is articulated, said piston being movable in said cylinder, the combination comprising:

a cylinder head adapted to cover said cylinder so as to form a combustion chamber, said cylinder head including:

two intake valve ports connected to two intake ducts, respectively, two exhaust valve ports connected to at least one exhaust duct, an injection valve mounting hole (17) leading to said combustion chamber, an upper cover surface (14) and, a longitudinal side wall (12), said exhaust duct (11) opening on said longitudinal side wall (12) of said cylinder head and said intake ducts (10a, 10b) opening on said upper cover surface (14) in a region of the cylinder head (1) on the side toward said longitudinal side wall (12).

2. The internal combustion engine of claim 1, wherein said exhaust ducts (11) are combined, at least at a single opening at said longitudinal side wall (12).

3. The internal combustion engine of claim 1 wherein said intake ducts (10a, 10b) open separately from one another on said upper cover surface (14).

4. The internal combustion engine of claim 1 wherein one of said intake ducts (10b) is designed as a swirl duct.

5. The internal combustion engine of claim 1 wherein said intake ducts (10a, 10b) pass on opposites sides of a cylinder head stud hole (2a).

6. The internal combustion engine of claim 1 wherein said engine has at least two cylinders (7a, 7b) and said cylinder head has a pair of intake ducts and at least one exhaust duct (11) for each cylinder and wherein an intake duct for one of said cylinders (7a) opens on said upper cover surface (14) above said exhaust duct (11) for the other of said cylinders (7b).

7. The internal combustion engine of claim 1 wherein said cylinder head includes a pair of intake valve stem openings (8a, 8b) and a pair of exhaust valve stem openings (9a, 9b), said pairs of valve stem openings being disposed, respectively in two planes which are parallel to one another and, disposed approximately 30° relative to a plane through the axis of said cylinder transverse to said longitudinal side wall (12).

8. The internal combustion engine of claim 1 wherein said intake ducts (10a, 10b) and said exhaust duct (11) are separated from one another by at least one coolant space (15a, 15b, 15c, 15d) in said cylinder head.

9. The internal combustion engine of claim 1 and further comprising an injection line duct (20) in said cylinder head (1) extending from the side of said cylinder head (1) opposite said longitudinal side wall (12) to said injection valve mounting hole (17) an injection line (16) in said injection line duct (20), said injection line (16) being adapted to connect to an injection valve installed in said injection valve mounting hole (17).

10. The internal combustion engine of claim 7, and further comprising an injection line duct (20) in said cylinder head (1) extending from the side of said cylinder head (1) opposite said longitudinal side wall (12) to said injection valve mounting hole (17) and an injection line (16) being adapted to connect to an injection valve installed in said injection valve mounting hole (17) and said injection line duct (20) being disposed between said parallel planes.

* * * * *

UNITED STATES PATENT AND TRADEMARK OFFICE
CERTIFICATE OF CORRECTION

PATENT NO. : 6,065,437
DATED : May 23, 2000
INVENTOR(S) : Kleinschmidt

It is certified that error appears in the above-indentified patent and that said Letters Patent is hereby corrected as shown below:

Col. 4, line 67, after "(17)" insert --- and ---;

Col. 6, line 1, after "(16)" insert --- in said injection line duct (20), said injection line (16) ---.

Signed and Sealed this

Tenth Day of April, 2001

Attest:

NICHOLAS P. GODICI

Attesting Officer

Acting Director of the United States Patent and Trademark Office